United States Patent [19]

Ko et al.

[11] 4,287,471
[45] Sep. 1, 1981

[54] STRIP CENTER LINE SENSOR

[75] Inventors: Wen H. Ko, Cleveland Heights; Chih P. Hung, Berea, both of Ohio

[73] Assignee: North American Manufacturing Company, Cleveland, Ohio

[21] Appl. No.: 41,875

[22] Filed: May 23, 1979

[51] Int. Cl.³ .......................................... G01R 27/26
[52] U.S. Cl. ............................ 324/61 R; 324/DIG. 1
[58] Field of Search ..................... 324/61 R, DIG. 1; 226/15; 242/57.1

[56] References Cited

U.S. PATENT DOCUMENTS

| | | |
|---|---|---|
| 2,558,761 | 7/1951 | Kentis et al. . |
| 2,644,243 | 7/1953 | Breeze et al. . |
| 2,777,069 | 1/1957 | Saeman . |
| 3,019,955 | 2/1962 | Walthall . |
| 3,268,140 | 8/1966 | Rouyer . |
| 3,323,699 | 6/1967 | Bricker, Jr. . |
| 3,774,238 | 11/1973 | Hardway, Jr. ...................... 324/61 R |
| 3,816,811 | 6/1974 | Rudolf ................................ 324/61 R |
| 3,869,676 | 3/1975 | Harrison et al. . |
| 3,883,812 | 5/1975 | Harrison et al. . |
| 3,924,177 | 12/1975 | Lemineur et al. ................. 324/61 R |
| 3,986,109 | 10/1976 | Poduje .............................. 324/61 R |

FOREIGN PATENT DOCUMENTS 670035 4/1952 United Kingdom .

Primary Examiner—Ernest F. Karlsen
Attorney, Agent, or Firm—Meyer, Tilberry & Body

[57] ABSTRACT

A sensing device for sensing the position of a continuously moving strip of metal and providing a signal for centering the strip on a given line of movement which has good linearity, good stability, and a time stable output. Segments of a pair of capacitor plates overlap each edge of the strip. These are energized by a square wave signal and the variation in capacity between the plates and the strip caused by lateral movement of the strip is detected by a diode bridge and the resultant signal made available to power apparatus for correcting the position of the web.

3 Claims, 4 Drawing Figures

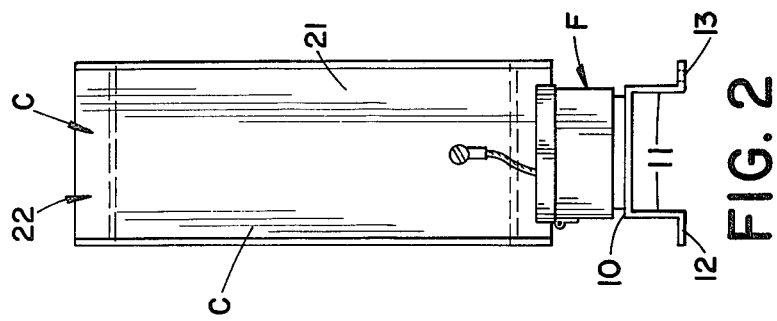
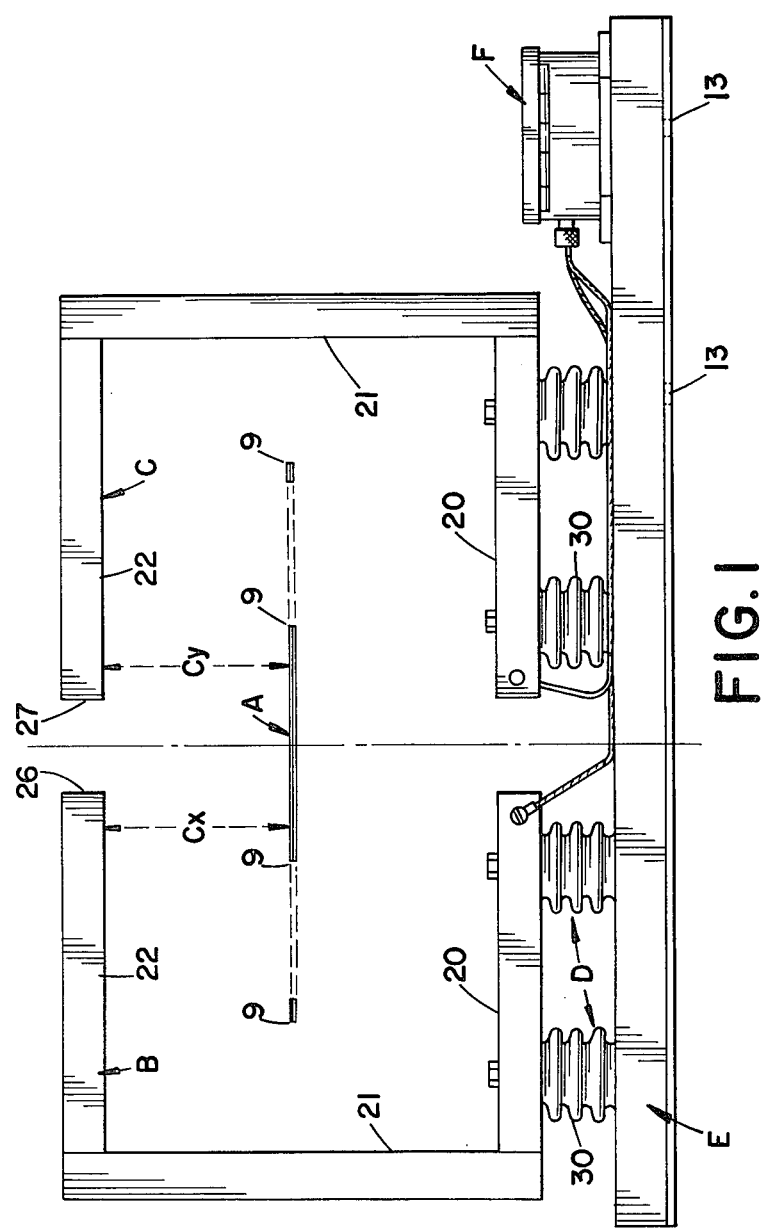
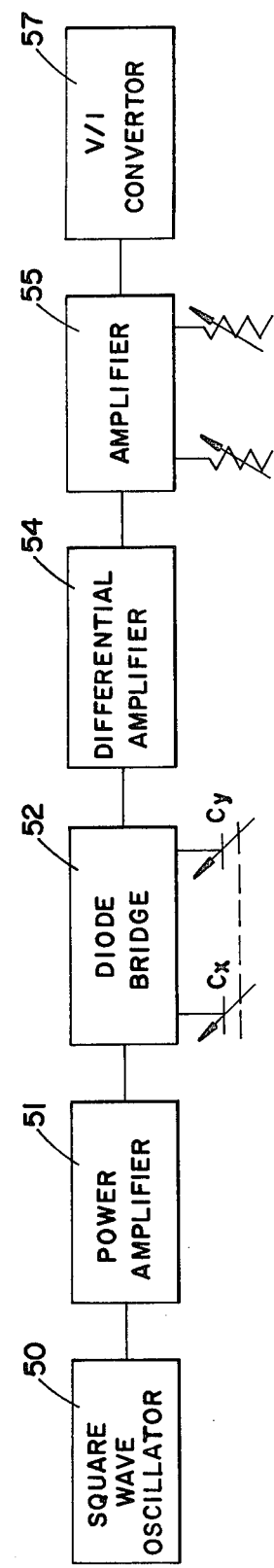

STRIP CENTER LINE SENSOR

This invention pertains to the art of sensing of the edges of sheet metal and, more particularly, to a capacitance type edge detector.

In particular, the invention is primarily adapted for use in conjunction with sensing the position of the edges of moving webs and generating an error signal capable of actuating power apparatus to center the strip in its line of movement and will be described with particular reference thereto although it will be appreciated the invention has other applications.

In the art of centering devices for moving webs, it has been conventional in the past to employ various types of sensors to determine the position of the edges in conjunction with means for amplifying the signal from the sensor into a usable signal or force which can then adjust apparatus causing the web to move laterally in its line of movement.

Typical of such apparatus is the patent to Kentis Jr., U.S. Pat. No. 2,558,761, (owned by the assignee of this application) which shows as alternative embodiments: physical means for engaging the edges of the strip; optical means for sensing the position of the edges; and, reactance means past which the edges of the strip move, all in conjunction with electrical apparatus which amplify the variations in the electrical signals outputted by the detectors.

Other patents are: Saeman, U.S. Pat. No. 2,777,069, which teaches the use of a web guide control device using a light source and photocell arranged adjacent one edge of a moving film for detecting the position of a film strip and correcting its lateral position; Bricker, U.S. Pat. No. 3,323,699, which uses a pair of capacitor plates adjacent each edge of the moving strip, the variation in capacity between the plates and the edges varying the resonant frequency of an associated tuned circuit relative to a fixed frequency power source and then using the variations to produce an error signal. Other patents showing edge detection are those to Walthall, U.S. Pat. No. 3,019,955, who uses photoelectric edge detection and Rouyer, U.S. Pat. No. 3,268,140, who refers to the use of either capacitive, inductive, or optical sensing of the edges for producing an error signal which can be used to correct the position of the moving web. Edge detection using a segment of a capacitor plate in overlapping relationship with a moving edge or edges is also known as shown in: Breeze, U.S. Pat. No. 2,644,243; and, British Pat. No. 670,035 issued May 22, 1950, which used capacitive variations to detect the variations in the total width of a moving strip.

In all of such patents using capacitance edge detection, either no description is given as to the means for converting the variation in capacity between the capacitor plate and the moving edge to a usable signal or tuned circuits comprised of an inductance and the plate-edge capacity are employed, all in conjunction with a sine wave oscillator power source. Such oscillators normally have an unstable frequency output and/or amplitude output unless the power supply voltages and/or environmental conditions are carefully regulated or controlled.

Additionally, all such circuits, because of the inductances, are relatively bulky, have poor stability, poor linearity, and a relatively high cost.

THE INVENTION

The present invention contemplates a capacitive type detector and associated circuitry for detecting the position of the edges of the moving strip and providing a usable output signal which can be used to position the strip, which overcomes all of the above referred to difficulties and others, and has good stability, good linearity and is simple and economical to manufacture.

In accordance with the present invention, there is provided in conjunction with a pair of capacitor plates having segments thereof adapted to be placed in overlapping relationship with the edges of a moving strip, a detecting and amplifying circuit comprised of a series diode bridge having a first pair of terminals each connected to one of the capacitor plates; means for producing a square wave signal; means feeding such signal through a pair of reactances to the second pair of terminals of the bridge; and, a differential amplifier associated with the second pair of terminals producing a signal proportional to the capacity variations between the capacitor plates and the strip edge as the strip moves laterally from its line of movement.

A series diode bridge has all four (or more) diodes connected with the same polarity and, in effect, the bridge steers the positive and negative going square wave pulses to one or the other of the capacitor plates. Importantly, the energy supplied to the bridge must be a square wave. As such, it may be produced by a simple resistor capacitance type oscillator which is simple in configuration, economical to manufacture, energy efficient, and frequency and amplitude stable.

OBJECTS

The principal object of the present invention is the provision of a new and improved edge detector which is simple in construction, economical to manufacture, and has good electrical characteristics.

Another object of the invention is the provision of a new and improved edge detector of the capacitance type which does not employ inductances or tuned circuits.

Another object of the invention is the provision of a new and improved edge detector of the capacitance type which has good linearity, good stability, and low cost.

Another object of the invention is the provision of a new and improved edge detector of the capacitive type which employs a simple oscillator circuit, is frequency insensitive, and has high stability.

Another object of the invention is the provision of a new and improved edge detector of the capacitive type wherein the frequency employed is unimportant and may be relatively varied at will.

Another object is to provide a capacitive type edge detector which uses a square wave as its energy source.

DRAWINGS

The invention may take physical form in certain parts and arrangements of parts a preferred embodiment of which will be described in detail in this specification and illustrated in the accompanying drawings which form a part hereof and wherein:

FIG. 1 is a cross-sectional view of a moving strip showing the capacitive edge detector plates in position relative thereto;

FIG. 2 is a side elevational view of FIG. 1;

FIG. 3 is a block diagram of the electrical circuitry; and

PREFERRED EMBODIMENT

Figure 4:
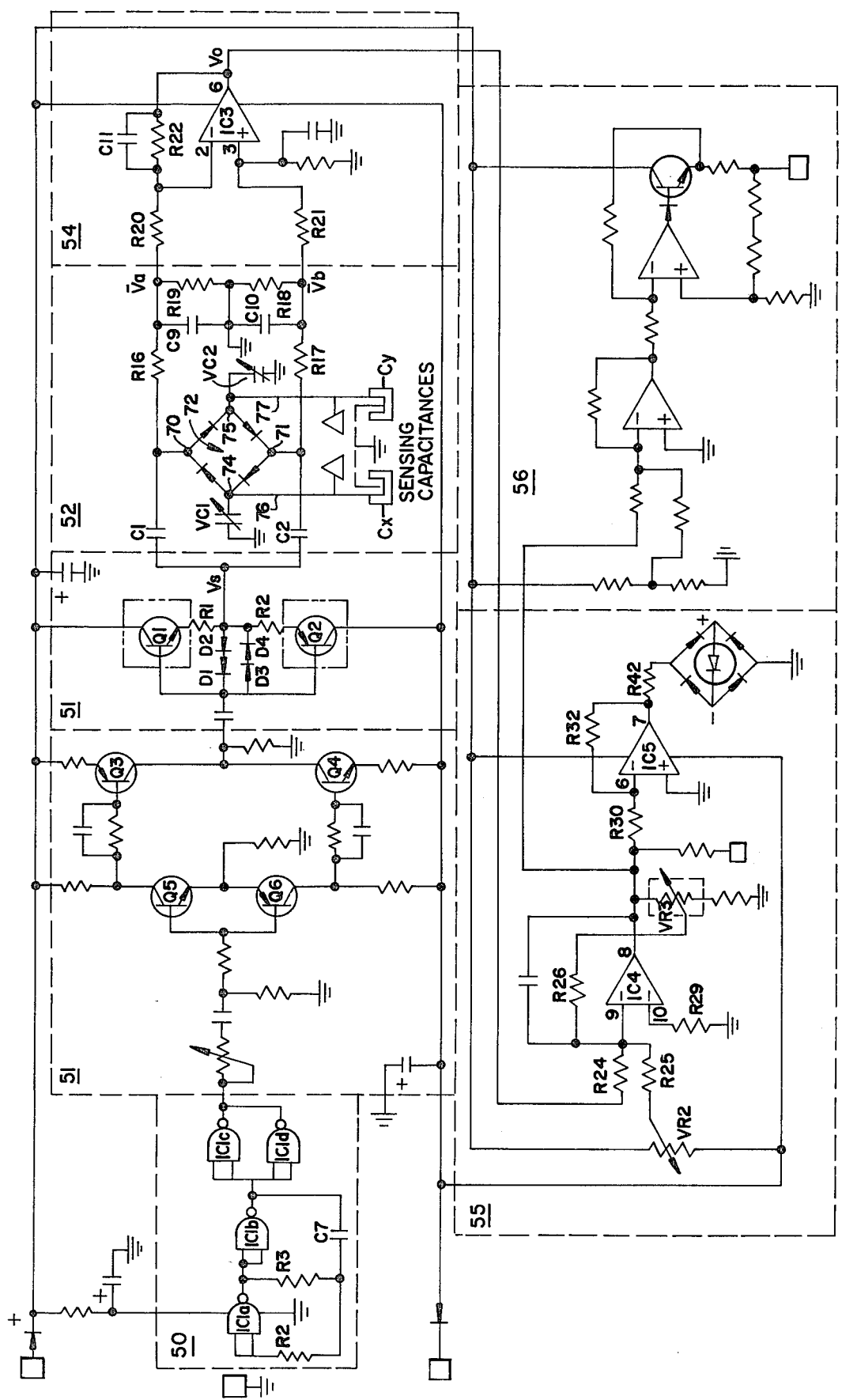
FIG. 4 is a circuit diagram of the critical portions of the electrical circuitry.

Referring now to the drawings wherein the showings are for the purposes of illustrating a preferred embodiment of the invention only and not for the purposes of limiting same, FIG. 1 shows an end view of the minimum width and the maximum width of strip A which can be treated by the invention passing between capacitor plates B, C mounted on stand-off insulators D on a supporting base E. Electrical circuitry for measuring the variation in capacity between the moving strip and the capacitor plate and producing an amplified output signal is located in a control box F in turn mounted on the base E.

The strip A may be any electrically conductive or dielectric type material and may either be moving on a predetermined line of movement or stationary, the point being that the strip has edges 9, the position of which is to be detected by capacitance variations with the plates B, C.

The base E forms no part of the present invention and in the embodiment shown is comprised of an inverted channel including a flat upper surface 10 and vertical legs 11 with the lower ends of the legs terminating in outwardly extending flanges 12 having openings 13 for mounting screws.

The capacitor elements are generally U-shaped inside view and are each comprised of a lower horizontal leg 20, a vertically extending leg 21, and an upper horizontally extending leg 22 with the horizontally extending legs 20, 22 extending towards each other from the leg 22 with the ends 26, 27 in spaced relationship. The two capacitor plates thus form a rectangular channel through which the moving strip A continuously passes. The strip A must have a width at least greater than the spacing between the ends 26, 27 of the legs and a maxi- width at least less than and preferably substantially less than the spacing between the two vertical legs 21. Also, the strip A preferably has a path of movement equally spaced between the upper and lower legs 20, 21.

The lower horizontal legs 20 in the embodiment shown are spaced from the base by pairs of stand-off insulators 30.

The legs preferably have a substantial width in the direction of movement of the strip such that for the minimum width of strip A, there will be a minimum capacity Cx, Cy between each capacitor plate and the strip of 10 pf. Preferably, the capacity Cx, Cy between the strip and the plate when the strip A is at maximum width will not exceed 300 pf.

It will be appreciated that as the center line of the strip moves laterally relative to the capacitor plates, the capacities Cx, Cy between the plates and the strip will vary inversely, one increasing as the strip moves towards it and the other decreasing, and vice versa.

While the use of variation in capacity (between capacitor plates and the edges of a sheet of metal to determine the position of the edges or of the centerline of the strip) is not new as is shown by the above referred to patents, the present invention contemplates a new and improved arrangement for converting the variation in capacity between the edges and the individual capacitor plates into a usable electrical signal. As is shown in FIG. 3, the means for converting this change of capacitance to a usable electrical signal is comprised of generally: a square wave oscillator 50 preferably having a frequency on the order of 1 MHz; a power amplifier therefor 51; a series diode bridge 52 having one pair of opposite terminals energized by the square wave through reactances and its other pair of opposite terminals connected one to each capacitor plate whereby as the capacitances between the capacitor plates and edges vary, differential voltages are produced; a differential amplifier 54 and a final amplifier 55 which produces an output voltage to an external means (not shown) which is capable of, as is conventional in the art, changing the position of the strip passing through the capacitor plates so that its center line may be exactly located as desired either on the center line of the capacitor plates or offset therefrom In addition, the apparatus includes a convertor 57 for converting the voltage output of the output amplifier to a constant current output.

Although the use of the square wave oscillator is of absolute importance to the invention, its circuitry is relatively conventional and will not be described in detail. In the preferred embodiment, it includes two NAND gates $ICI_a$, $ICI_b$ interconnected with a pair of resistors R2, R3 and a capacitor C7 to form a multivibrator. The output of the square wave generator is fed into a pair of NAND gates $ICI_c$, $ICI_d$ connected in parallel and this output is then fed into a conventional power amplifier comprised of a plurality of transistors Q1–Q6 of conventional configuration. Diodes D1, D2 in series and diodes D3, D4 in series but of opposite polarity connected between the bases of output transistors Q1, Q2 and the common point of the emitters thereof through resistors R1, R2 limit the output Vs of the amplifier.

The output Vs of this power amplifier is then fed through a pair of capacitors C1, C2 one to each of the opposite terminals 70, 71 of a diode bridge 72 comprised of four diodes connected in series in a ring, i.e., same direction of polarity. The other pair of terminals 74, 75 are each connected to one of the capacitor plates B, C through conductors 76, 77 preferably contained in a grounded braided shield (not shown). Variable capacitors VC1 and VC2 are connected between terminals 74, 75 and ground and are adjusted at the time the apparatus is set up to provide a zero voltage output from the output amplifier.

Assuming that the capacitances of VC1 and VC2 are equal and the capacitances between the capacitor plates B, C and the moving strip A are equal, the voltages at the input terminals of the bridge will be the same but out of phase.

Thus, the diode bridge 72 steers the square wave pulses from the capacitors C1, C2 to the capacitors VC1, VC2 and the capacitances Cx, Cy between the capacitor plates B, C and the strip edge. As the capacitances Cx, Cy vary due to transverse movement of the strip relative to the capacitor plates, the diode bridge 72 converts the difference of capacitance between Cx and Cy into DC voltages X, Y at terminals 70, 71 as follows:

$$\overline{V_a} = \frac{C_x - C_y}{C_x + C_y} \times \overline{V_s} = \overline{V_b}$$

where Vs is the voltage of the source, Va is the voltage at terminal 70 of the bridge and Vb is the voltage at terminal 71 of the bridge. These two voltages are then fed through resistors R16, R20, and R17, R21 to the input terminals 2, 3 of a differential amplifier IC3. Capacitor and resistor combinations C9, R19 and C10, R18 to ground filter these voltages. Resistor R22 and capacitor C11 in parallel provide a feedback circuit for this operational amplifier controlling, in combination with the resistor R20, the gain.

The output voltage Vo on terminal 6 of IC3 is then fed through resistor R24 to the input terminal 9 of an operational amplifier IC4, the output signal of which is on terminal 8. The other input terminal 10 of IC4 is connected through resistor R29 to ground. For the purpose of nulling the output of operational amplifier IC4, potentiometer VR2 is connected between the DC supply voltages with the potentiometer arm connected through resistor R25 to input terminal 9 of operational amplifier IC4.

The voltage output of operational amplifier IC4 on terminal 8 is then fed through potentiometer VR3 and the potentiometer arm connected to input terminal 9 through resistor R26 to control the gain. The output is also fed to the input terminal 6 of operational amplifer IC5 through resistor R30, the other input terminal of which is connected to ground. The output of IC5 at terminal 7 is fed through resistor R42 to the input terminals of a diode rectifier bridge comprised of four diodes connected in a conventional rectifier circuit with the output terminals having a LED connected thereacross. Resistors R32 and R30 determine the gain of amplifier IC5.

The voltage output on terminal 8 is also fed to the input terminals of the voltage-current converter 57 of conventional construction and circuitry which converts variations in the voltage output of the output amplifier into an output current equal to $K \times Vo$.

It will thus be seen that inverse variations in the capacitances between the capacitor plates B, C and the strip edges will produce variations in the amplitude of the square wave voltages applied to the input terminals of the differential amplifier IC3 and a single output voltage Vo is produced which can be amplified and used for any desired purpose.

The steering type diode bridge, for detecting variations in the capacitance between the capacitor plates and the strip, has excellent linearity, good stability, minimum volume, and low cost.

The use of a square wave as the power source for the diode bridge enables the use of an extremely simple oscillator circuit, increases the power efficiency over a sine wave, gives a stable amplitude to the voltage supplied to the capacitor plates and improves the stability of the voltage output. Additionally, the symmetric preamplifier provides a time-stable output.

Using the design shown, the frequency of the square wave oscillator can be changed without effect on the performance of the total circuit. As long as symmetry is maintained, the connection between the diode bridge and the capacitor plates can be as long or short as desired without effecting the timing and/or the output of the device.

Thus, it will be seen that an embodiment of the invention has been described in sufficient detail to enable those skilled in the art to which the invention pertains to easily make and use the same and which accomplishes all of the objectives heretofore set forth and others.

The invention has been described with reference to a preferred embodiment. Obviously modifications and alterations will occur to others upon a reading and understanding of this specification and it is the intention to include all such modifications and alterations insofar as they come within the scope of the appended claims.

Having described the invention, it is claimed:

1. In a capacitance type detecting device for the edges of a moving metal strip having first and second capacitor plates each having a segment thereof overlapping an opposite edge of the strip and capacitively co-acting with said strip to form a first capacitor and a second capacitor; said strip being at a reference potential; means energizing said capacitor plates with an alternating current referenced to said reference potential and indicating means for producing an output signal indicating movement of the strip laterally relative to the capacitor plates, the improvement which comprises: said indicating means comprising a diode bridge including first, second, third and fourth bridge terminals consecutively coupled together by four diodes polarized in circulating relationship, means connecting said second bridge terminal to said first capacitor plate, means connecting said fourth bridge terminal to said second capacitor plate; said energizing means being comprised of means generating a square wave, means amplifying said square wave to a constant amplitude, means feeding said amplified square wave through a first reactance to said first diode bridge terminal and means feeding said amplified square wave through a second reactance to said third diode bridge terminal; and, said indicating means reading an output voltage between said first diode bridge terminal and said third diode bridge terminal proportional to lateral variations of position of the moving strip.

2. The improvement of claim 1 wherein second amplifying means are provided for said output signal in combination with nulling means for nulling the output of the second amplifier.

3. The improvement of claim 1 or 2 wherein said first and second reactances are capacitors.

* * * * *